(12) United States Patent
Tsuchida

(10) Patent No.: US 11,864,688 B2
(45) Date of Patent: Jan. 9, 2024

(54) COFFEE MACHINE

(71) Applicant: DAITO GIKEN, INC., Tokyo (JP)

(72) Inventor: Junya Tsuchida, Tokyo (JP)

(73) Assignee: DAITO GIKEN, INC., Tokyo (JP)

( * ) Notice: Subject to any disclaimer, the term of this patent is extended or adjusted under 35 U.S.C. 154(b) by 0 days.

(21) Appl. No.: 18/026,253

(22) PCT Filed: Jun. 24, 2022

(86) PCT No.: PCT/JP2022/025294
§ 371 (c)(1),
(2) Date: Mar. 14, 2023

(87) PCT Pub. No.: WO2022/270619
PCT Pub. Date: Dec. 29, 2022

(65) Prior Publication Data
US 2023/0255405 A1    Aug. 17, 2023

(30) Foreign Application Priority Data
Jun. 25, 2021    (JP) .................................. 2021-105831

(51) Int. Cl.
*A47J 42/40* (2006.01)
*A47J 31/42* (2006.01)

(52) U.S. Cl.
CPC ................ *A47J 42/40* (2013.01); *A47J 31/42* (2013.01)

(58) Field of Classification Search
CPC .................................. A47J 42/40; A47J 31/42
See application file for complete search history.

(56) References Cited

U.S. PATENT DOCUMENTS

2006/0096469 A1* 5/2006 Morin ................ A47J 31/3614
99/495

FOREIGN PATENT DOCUMENTS

| JP | S63-5580 U | 1/1988 |
| JP | H01-155578 U | 10/1989 |
| JP | H05-023252 A | 2/1993 |
| KR | 102239350 B1 * | 4/2021 |

OTHER PUBLICATIONS

English translate (KR102239350B1), retrieved date Jun. 25, 2023.*
(Continued)

*Primary Examiner* — Matthew Katcoff
*Assistant Examiner* — Mohammed S. Alawadi
(74) *Attorney, Agent, or Firm* — Oliff PLC

(57) ABSTRACT

The present invention relates to a coffee machine equipped with a grinder that grinds coffee beans, and a mechanism that reduces ground beans on an inner peripheral wall of a chute. A hammer includes a striking member that abuts against a chute by an elastic force in an initial state, and a second holding member that sandwiches and holds a cup with the first holding member by the elastic force, and enters a striking preparation state in which the striking member is temporarily separated from the chute by pivoting from the initial state, the second holding member is disposed at a position where a distance from the first holding member is smaller than a thickness of an peripheral wall of the cup in the initial state, and the striking member applies an impact to the chute when the hammer returns from the striking preparation state to the initial state by the elastic force.

5 Claims, 8 Drawing Sheets

(56) References Cited

OTHER PUBLICATIONS

Aug. 16, 2022 International Search Report issued in Patent Application No. PCT/JP2022/025294.
Apr. 7, 2022 Office Action issued in Japanese Patent Application No. 2021-105831.

* cited by examiner

[Figure 1]
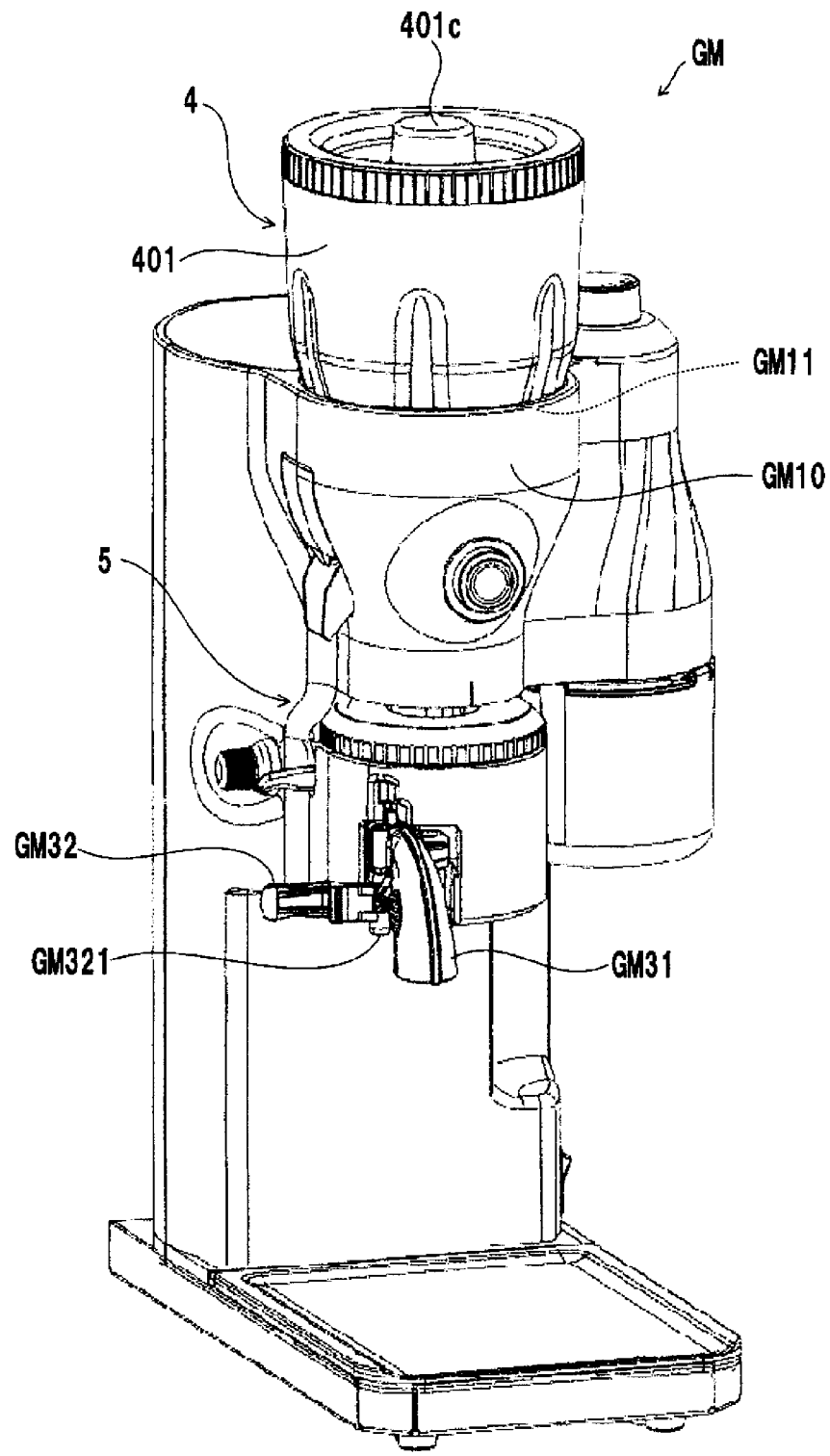

[Figure 2]
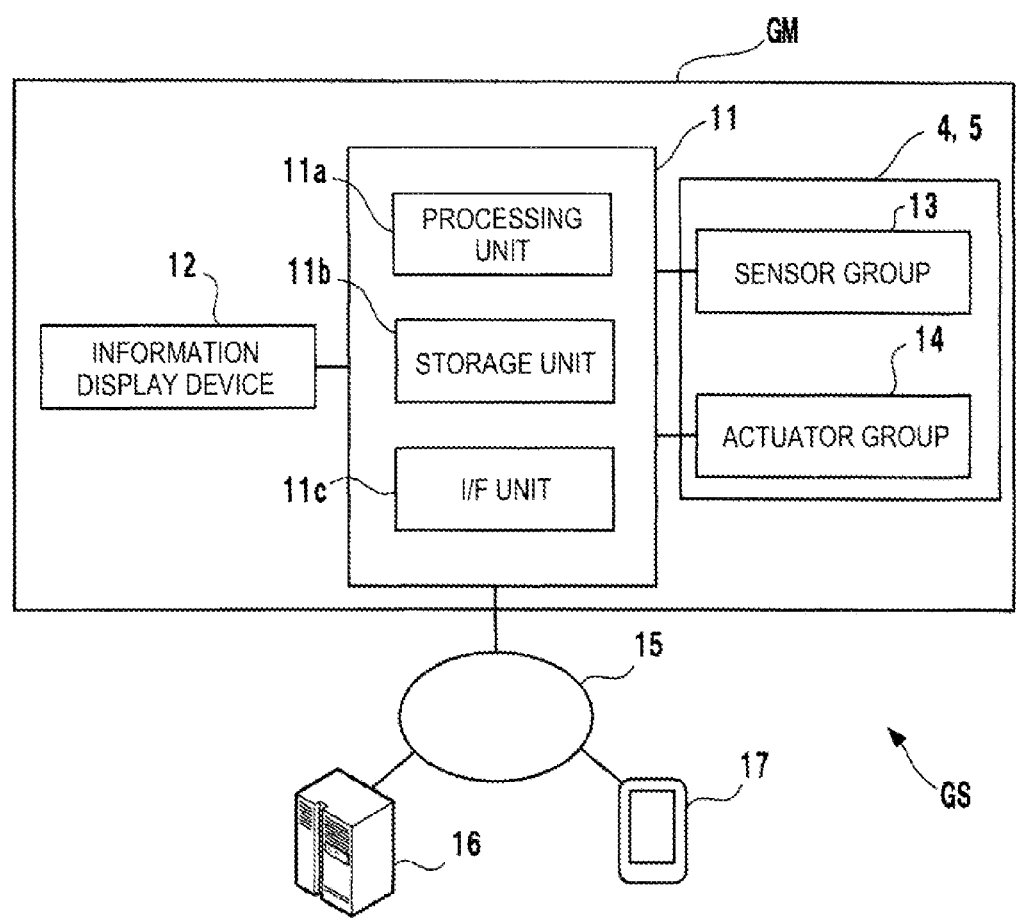

[Figure 3]
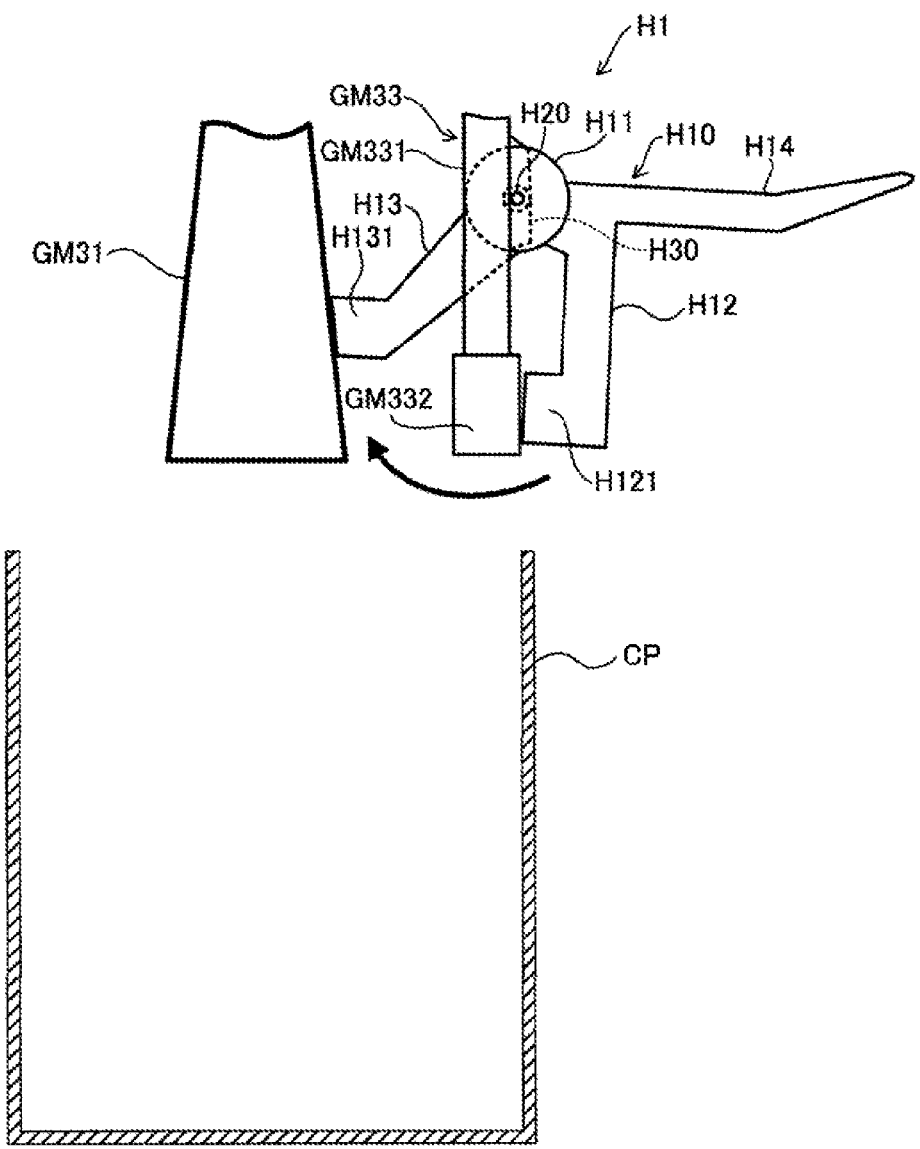

[Figure 4]
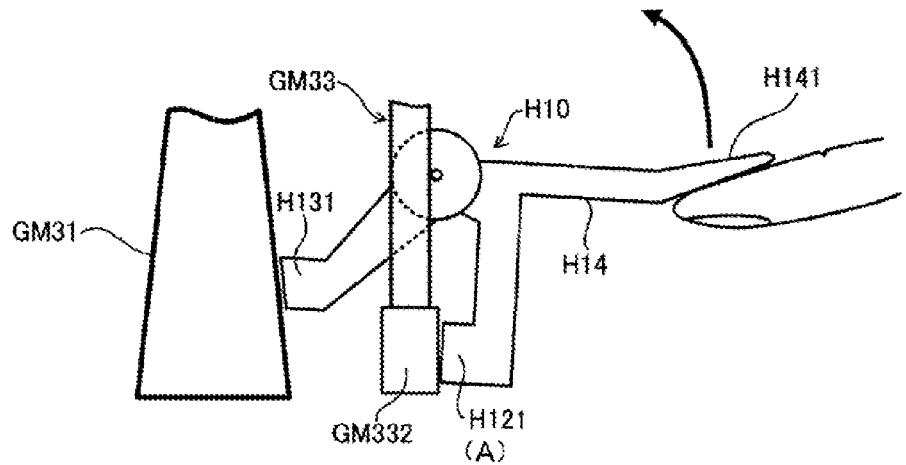
(A)
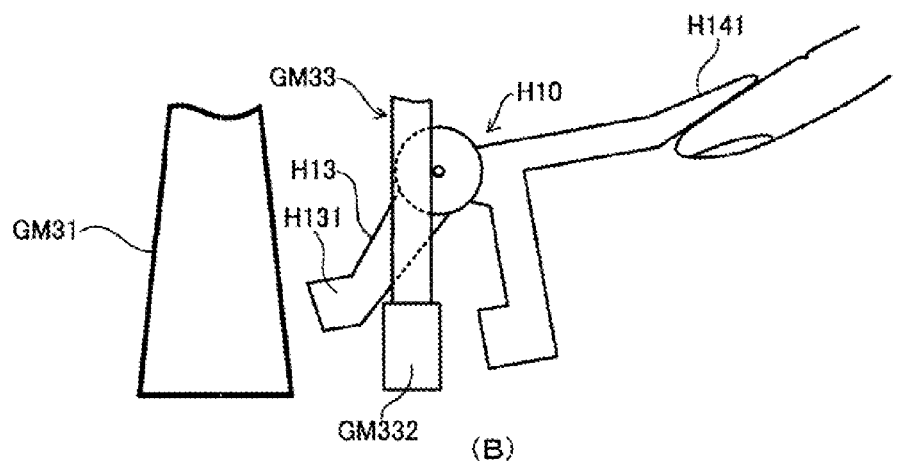
(B)
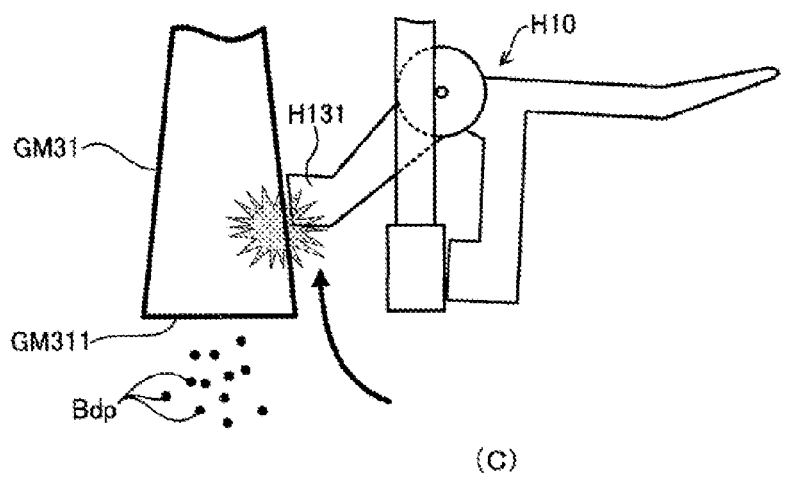
(C)

[Figure 5]
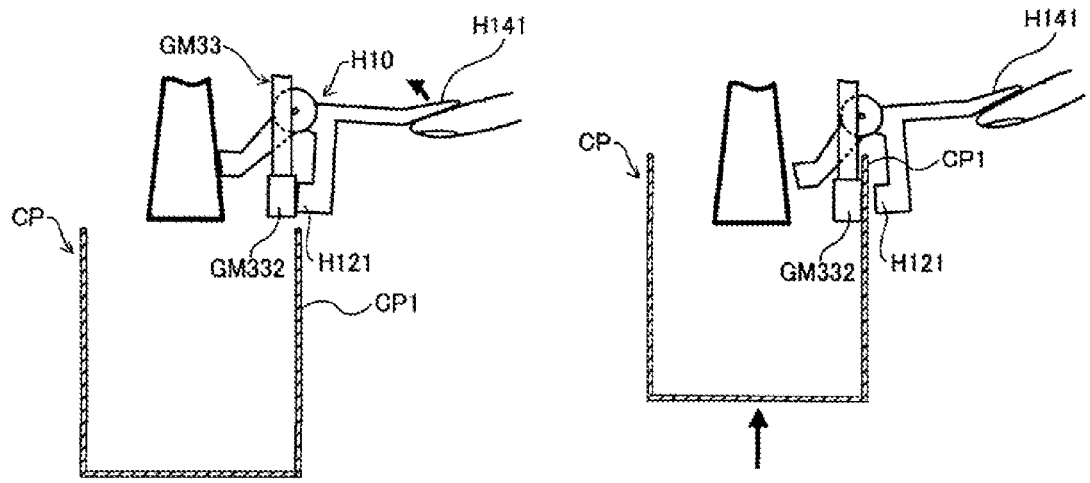
(A)  (B)
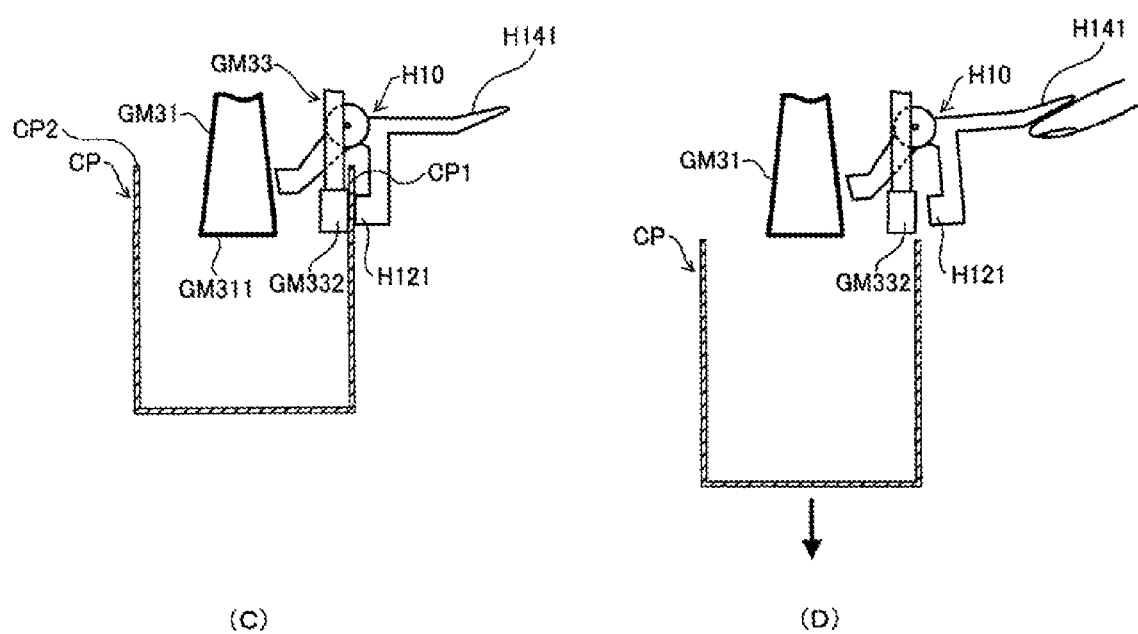
(C)  (D)

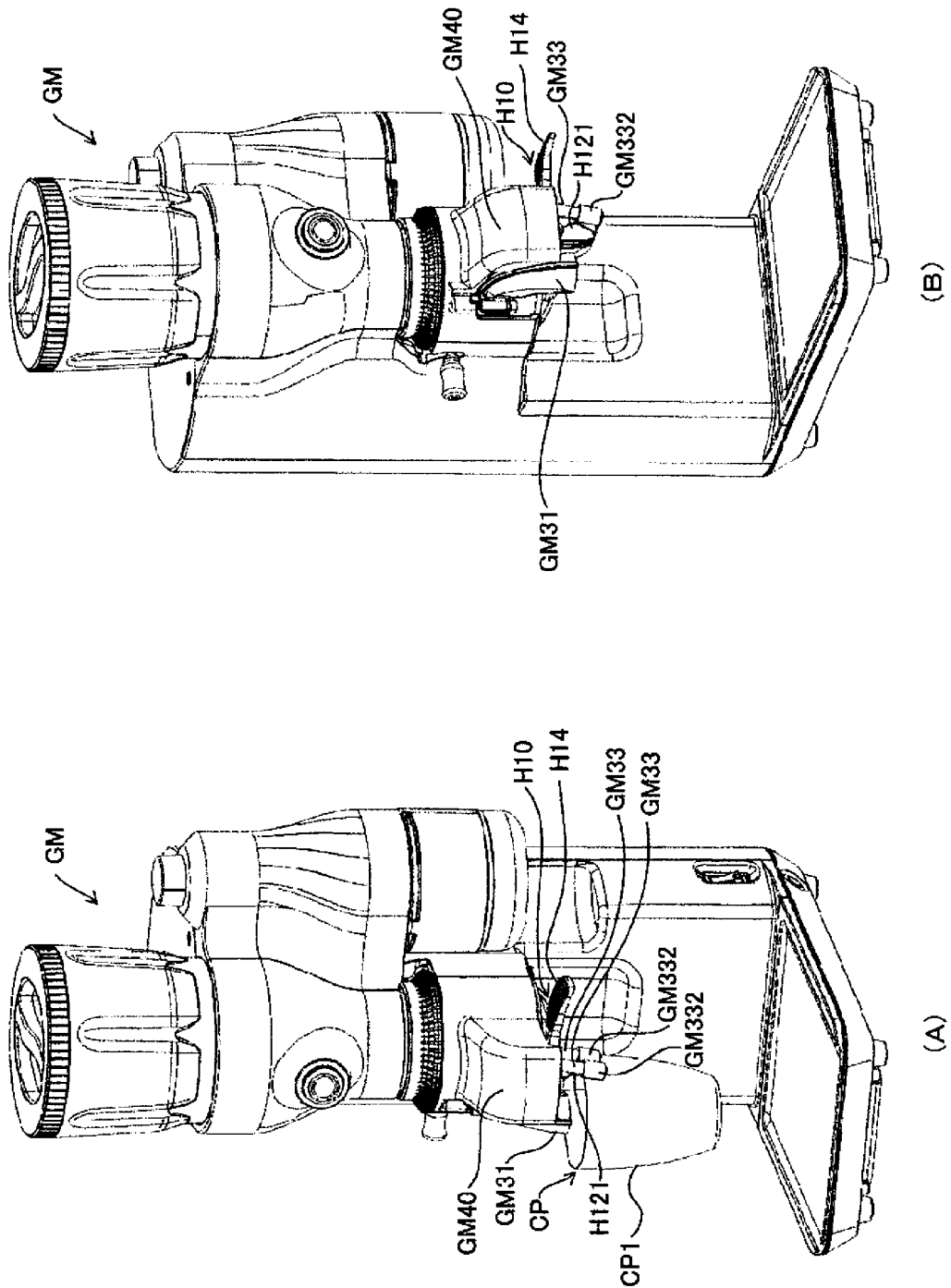
[Figure 6]

[Figure 7]
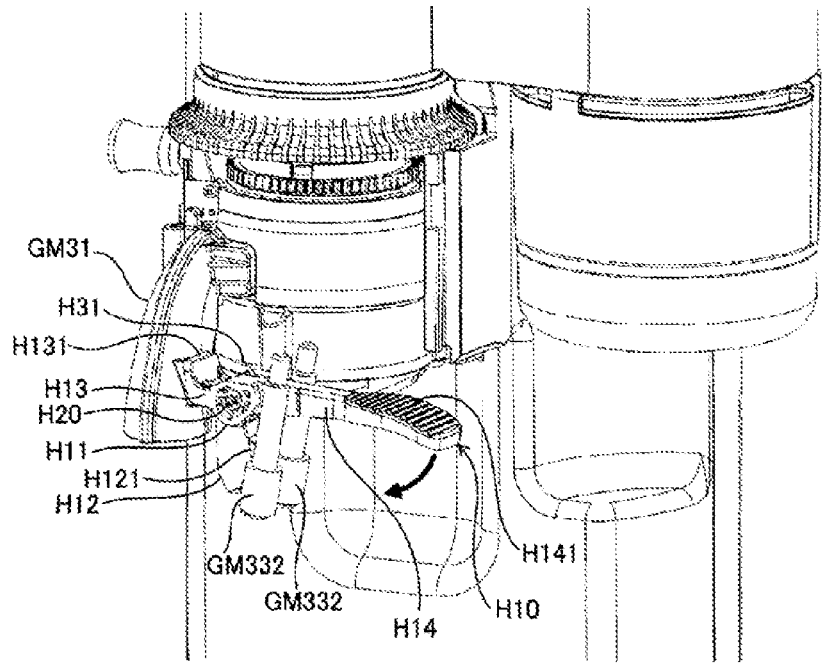
(A)
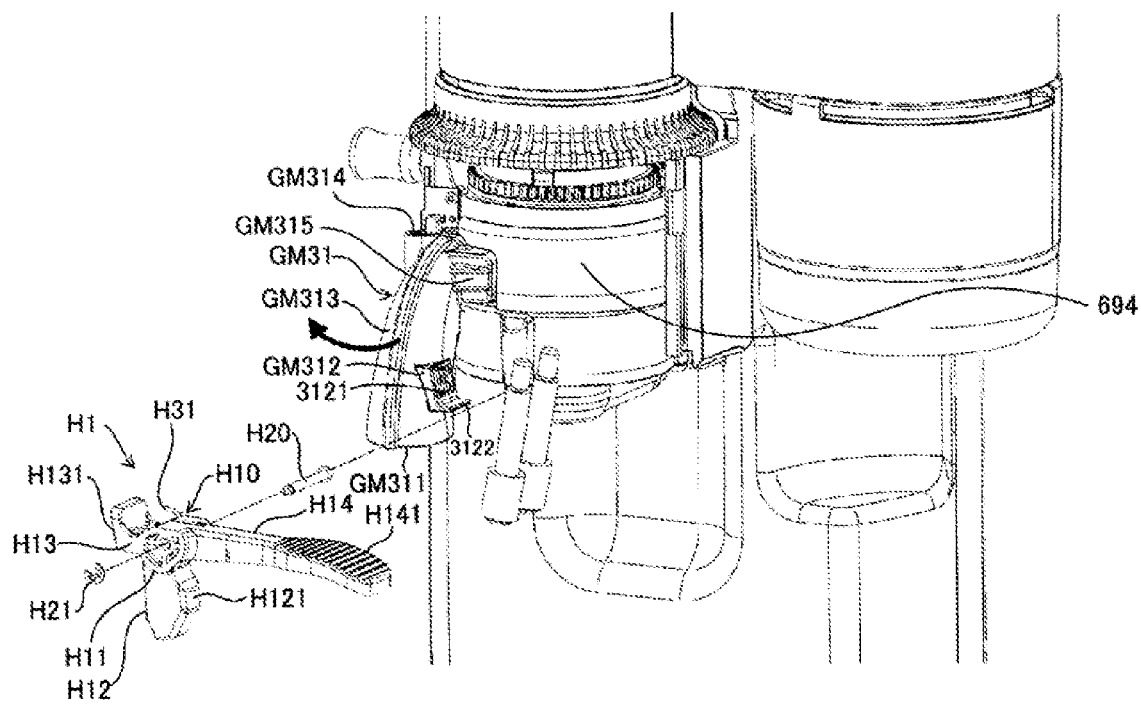
(B)

[Figure 8]
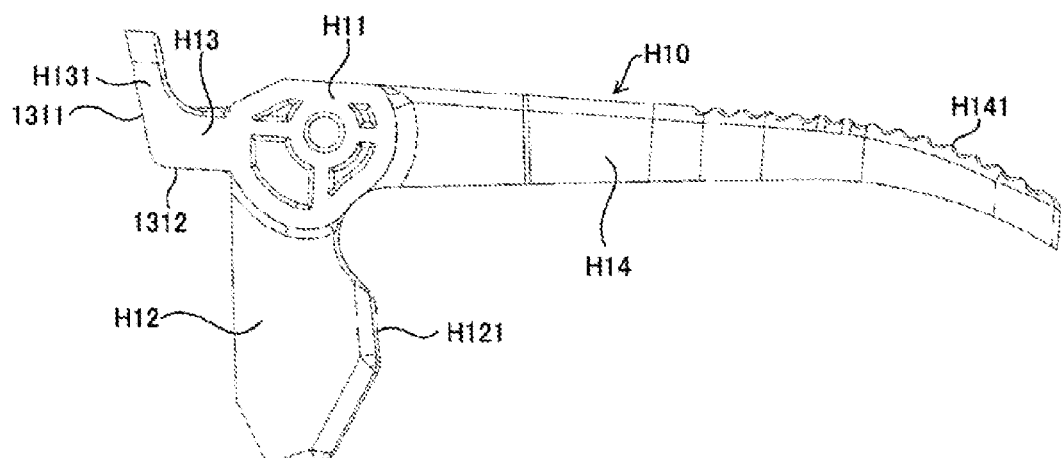
(A)
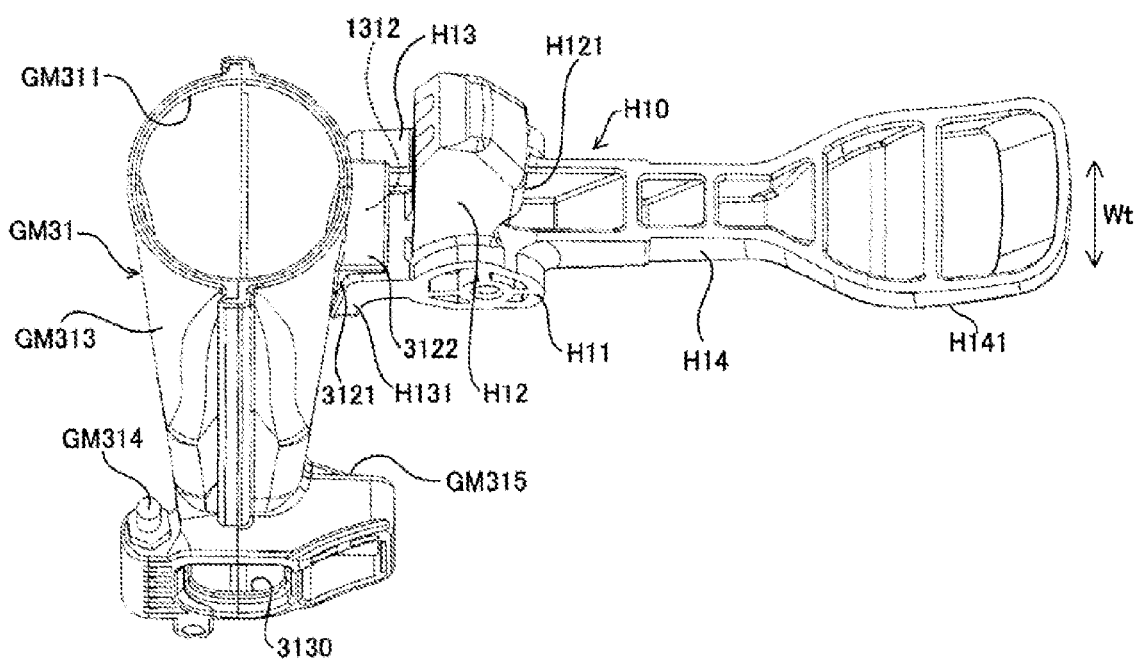
(B)

COFFEE MACHINE

TECHNICAL FIELD

The present invention relates to a coffee machine equipped with a grinder that grinds coffee beans.

BACKGROUND ART

Among coffee machines that perform adjustment using coffee beans, those equipped with a coffee bean grinding mechanism (grinder) and a coffee beverage extraction mechanism, and those equipped with only the grinder are known.

In a coffee machine provided with a chute that discharges ground beans obtained by grinding the coffee beans, the ground beans may accumulate on an inner peripheral wall of the chute, which may hinder the discharge of the ground beans.

Therefore, a coffee machine has been proposed in which a dedicated mechanism that continuously strikes a chute by driving a motor is provided to prevent ground beans from accumulating on an inner peripheral wall of the chute due to vibration when the chute is struck (see, for example, Patent Literature 1).

CITATION LIST

Patent Literature

Patent Literature 1: Japanese Patent Laid-Open No. 5-23252

SUMMARY OF INVENTION

Technical Problem

However, in the coffee machine proposed in Patent Literature 1, since the dedicated mechanism that strikes the chute is provided, a size of the coffee machine is increased, which also leads to an increase in cost.

In view of the above circumstances, an object of the present invention is to provide a coffee machine in which a mechanism that reduces accumulation of ground beans on an inner peripheral wall of a chute is mounted compactly and inexpensively.

Solution to Problem

A coffee machine according to the present invention for solving the above problems is a coffee machine including a grinder configured to grind coffee beans, and a chute configured to discharge ground beans ground by the grinder. The coffee machine includes:

a pivotable hammer; and
a first holding member,
the hammer includes a striking member that abuts against the chute by an elastic force in an initial state, and a second holding member that sandwiches and holds a cup accommodating the ground beans discharged from the chute with the first holding member by the elastic force, and enters a striking preparation state in which the striking member is temporarily separated from the chute by pivoting from the initial state,
the second holding member is disposed at a position where a distance from the first holding member is smaller than a thickness of a peripheral wall of the cup in the initial state, and the striking member applies an impact to the chute when the hammer returns from the striking preparation state to the initial state by the elastic force.

The coffee machine can be widely applied as long as the coffee machine is a device that performs adjustment using the coffee beans, and may be a coffee beverage production device or a coffee bean grinding machine.

An elastic force imparting member (for example, a spring member) that imparts the elastic force may be provided.

The hammer may enter a holding state when the cup is inserted between the first holding member and the second holding member. The holding state may be a state in which the gap can be formed between the striking member and the chute.

The second holding member may be disposed at a position in contact with the first holding member in the initial state.

The hammer includes the striking member and the second holding member at different positions. For example, the striking member and the second holding member may be provided at branched positions. That is, the hammer may include a first arm portion [for example, a striking arm H13] and a second arm portion [for example, a holding arm H12] different from the first arm portion, the first arm portion may be provided with the striking member [for example, a striking portion H131], and the second arm portion may be provided with the second holding member [for example, a holding portion H121]. More specifically, the hammer may include the first arm portion that abuts against the chute in the initial state and the second arm portion that abuts against the peripheral wall of the cup in the holding state, the first arm portion may be provided with the striking member at a portion that abuts against the chute in the initial state, and the second arm portion may be provided with the second holding member at a portion that abuts against the peripheral wall of the cup in the holding state.

In the coffee machine, at least one of the first holding member and the second holding member may include an anti-slip portion.

Each of the first holding member and the second holding member may include the anti-slip portion.

In the coffee machine, one of the first holding member and the second holding member may be in contact with the peripheral wall at one position from an inner side of the peripheral wall, and the other of the first holding member and the second holding member with respect to the one holding member may be in contact with the peripheral wall at two locations from an outer side of the peripheral wall.

Further, in the coffee machine, the first holding member may be fixedly disposed and correspond to the other holding member, and the second holding member may correspond to the one holding member.

In the coffee machine described above, the hammer may include an operation portion that is operated when the hammer shifts from the initial state to the striking preparation state, and the operation portion may be located on a right hand side of an operator.

The operation portion is operated both when the hammer shifts from the initial state to the holding state and when the hammer returns from the holding state to the initial state.

Advantageous Effects of Invention

According to the present invention, it is possible to provide a coffee machine in which a mechanism that reduces accumulation of ground beans on an inner peripheral wall of a chute is mounted compactly and inexpensively.

BRIEF DESCRIPTION OF DRAWINGS

FIG. 1 is an external perspective view of a coffee bean grinding machine.

FIG. 2 is a block diagram of a control device of the coffee bean grinding machine.

FIG. 3 is a view schematically showing a hammer mechanism according to a modification together with a chute.

FIG. 4 shows views showing a striking operation of a hammer H10 in stages.

FIG. 5 shows views showing a holding operation of holding a cup CP by a holding portion H121 of the hammer H10 and a fixed holding member GM33 in stages.

FIG. 6 shows perspective views of a coffee bean grinding machine according to a second embodiment.

(A) of FIG. 7 is an enlarged view showing a state in which a front cover GM40 is removed from a coffee bean grinding machine GM shown in FIG. 6, and (B) of FIG. 7 is an exploded perspective view of a hammer mechanism H1.

(A) of FIG. 8 is a side view of the hammer H10, and (B) of FIG. 8 is a perspective view showing the hammer H10 and a chute GM31 from below.

DESCRIPTION OF EMBODIMENTS

An embodiment of the present invention will be described with reference to the drawings.

FIG. 1 is an external perspective view of a coffee bean grinding machine, and FIG. 2 is a block diagram of a control device of the coffee bean grinding machine.

A coffee bean grinding machine GM shown in FIG. 1 includes a reservoir device 4, a pulverizing device 5, and a control device 11 shown in FIG. 2, which controls these devices. The coffee bean grinding machine GM also includes an information display device 12 (see FIG. 2) wirelessly connected to the control device 11. The information display device 12 is a touch panel type display for inputting various control instructions, set values, and the like of the coffee bean grinding machine GM, and can receive input from an administrator or a user in addition to displaying various kinds of information. The information display device 12 is provided with a speaker and a camera.

The control device 11 controls the entire coffee bean grinding machine GM. The control device 11 includes a processing unit 11a, a storage unit 11b, and an interface (I/F) unit 11c. The processing unit 11a is, for example, a processor such as a CPU. The storage unit 11b is, for example, a RAM or a ROM. A recipe is stored in the storage unit 11b. The recipe includes information on various conditions for grinding coffee beans, beans information, recipe creator information, comments of a recipe creator, and the like. The I/F unit 11c includes an input and output interface that inputs and outputs a signal between an external device and the processing unit 11a. The I/F unit 11c also includes a communication interface capable of performing data communication with an external terminal such as a server 16 or a mobile terminal 17 via a communication network 15 such as the Internet. The server 16 can communicate with the mobile terminal 17 such as a smartphone via the communication network 15, and can receive, for example, information such as a reservation for production of ground beans of coffee and an impression from the mobile terminal 17 of a consumer. A coffee bean grinding system GS that grinds the coffee beans includes the coffee bean grinding machine GM, the server 16, and the mobile terminal 17.

The processing unit 11a executes a program stored in the storage unit 11b, and controls the reservoir device 4 and the pulverizing device 5 in accordance with the recipe. More specifically, the processing unit 11a controls an actuator group 14 in accordance with the recipe, and controls the actuator group 14 based on an instruction from the information display device 12, a detection result of a sensor group 13, or an instruction from the server 16. The sensor group 13 includes various sensors (for example, operation position detection sensors and the like of a mechanism) provided in the reservoir device 4 and the pulverizing device 5. The actuator group 14 includes various actuators (for example, motors) provided in the reservoir device 4 and the pulverizing device 5.

The reservoir device 4 shown in FIG. 1 includes a cylindrical canister accommodation unit 401 and a detachable cap 401c that is screwed to an upper end portion of the canister accommodation unit 401 and covers an upper surface of the canister accommodation unit 401. A canister accommodation chamber (not shown) is provided inside the canister accommodation unit 401. A plurality the of canister accommodation chambers are provided in a circumferential direction, and a plurality of canisters can be accommodated inside the canister accommodation unit 401. In the reservoir device 4, the plurality of canisters accommodated therein can be selectively used. Therefore, it is possible to select roasted coffee beans of different varieties or roasted coffee beans having different degrees of roasting and perform a grinding process, and it is also possible to mix a plurality of varieties of roasted coffee beans having different degrees of roasting and perform the grinding process.

The canister accommodation unit 401 is detachably attached to an option attachment portion GM11 provided in an upper portion of a center casing GM10 of the coffee bean grinding machine GM. In addition to the canister accommodation unit 401, a plurality of types of units can be attached to the option attachment portion GM11. The upper portion of a center casing GM10 covers a lower portion of the unit attached to the option attachment portion GM11. A type of the unit attached to the option attachment portion GM11 may be displayed on the external terminal such as the mobile terminal 17 capable of communicating with the coffee bean grinding machine GM.

The pulverizing device 5 includes a first grinder, a second grinder, and a separation device. The first grinder and the second grinder are mechanisms that grind the roasted coffee beans. The roasted coffee beans are ground by the first grinder, and then further ground by the second grinder into powder. That is, the first grinder and the second grinder are different in ground particle size of beans. The first grinder is a grinder for coarse grinding, and the second grinder is a grinder for fine grinding. Each of the first grinder and the second grinder is an electric grinder, and includes a motor as a drive source, a rotary blade driven by the motor, and the like. A size (particle size) of the roasted coffee beans to be pulverized can be changed by changing the number of rotations of the rotary blade. The separation device is a mechanism that separates waste such as chaff and fine powders from the ground beans.

The ground beans ground by the second grinder are discharged from a chute GM31 shown in FIG. 1.

The chute GM31 shown in FIG. 1 guides the ground beans delivered in a substantially horizontal direction downward. The coffee bean grinding machine GM shown in FIG. 1 is provided with a hammer member GM32 that strikes the chute GM31. The hammer member GM32 pivots about a pivot shaft GM321 extending in an upper-lower direction. The ground beans delivered in the substantially horizontal direction may collide with an inner wall of the chute GM31 and adhere to the inner wall thereof. The user pivots the hammer member GM32 to strike the chute GM31, and applies an impact to the adhered ground beans to cause the ground beans to fall.

Next, a modification of the hammer member GM32 shown in FIG. 1 will be described. In the following description, components having the same names as those of the components described above are denoted by the same reference numerals as those used above.

FIG. 3 is a view schematically showing a hammer mechanism according to a modification together with a chute. FIG. 3 is a front view in which a front side of the paper is a front side and a right side is a left side of a coffee bean grinding machine.

A hammer mechanism H1 is disposed on the left side of the coffee bean grinding machine with respect to the chute GM31, that is, on a right hand side of an operator. Therefore, the hammer mechanism H1 is disposed on a side opposite to the hammer member GM32 shown in FIG. 1. The hammer mechanism H1 shown in FIG. 3 includes a hammer H10, a shaft H20, and a torsion coil spring H30. The shaft H20 is fixed to a front cover (not shown). The hammer H10 pivots manually from an initial position, and the shaft H20 passes through a pivot center of the hammer H10. The torsion coil spring H30 is fitted to the shaft H20, and the hammer H10 manually pivoted from the initial position returns to the initial position by an elastic force of the torsion coil spring H30. A pivoting operation of the hammer H10 will be described in detail later. The hammer H10 is obtained by integrally molding a nylon resin containing glass fibers. The hammer H10 includes a shaft penetrating portion H11, a holding arm H12 extending downward from the shaft penetrating portion H11, a striking arm H13 extending from the shaft penetrating portion H11 toward the chute GM31, and an operation arm H14 extending from the shaft penetrating portion H11 toward a side opposite to the chute GM31.

In FIG. 3, a fixed holding member GM33 is shown, and a cup CP accommodating the ground beans discharged from the chute GM31 is also shown below the fixed holding member GM33. The cup CP is not an element constituting the coffee bean grinding machine, but is held by a hand of an operator.

Although only one fixed holding member GM33 is shown in FIG. 3, two fixed holding members GM33 are provided side by side in a backward direction of the coffee bean grinding machine, and in FIG. 3, the other fixed holding member is disposed on a back side of the fixed holding member GM33 shown in FIG. 3. The fixed holding member GM33 is located between the holding arm H12 of the hammer H10 and the chute GM31. The fixed holding member GM33 includes a shaft GM331 fixed to a front cover (not shown) and a rubber cap GM332 attached to a lower end of the shaft GM331.

A holding portion H121 protruding toward the fixed holding member GM33 is provided at a tip end portion of the holding arm H12 of the hammer H10, and the holding portion H121 shown in FIG. 3 abuts against the rubber cap GM332 of the fixed holding member GM33. A striking portion H131 is provided at a tip end portion of the striking arm H13 of the hammer H10 shown in FIG. 3, and the striking portion H131 shown in FIG. 3 abuts against a left side wall portion of the chute GM31. Further, the operation arm H14 of the hammer H10 shown in FIG. 3 extends to the right hand side of the operator. The hammer H10 shown in FIG. 3 is in an initial state. That is, the hammer H10 is biased in a clockwise arrow direction by the elastic force of the torsion coil spring H30, and the striking portion H131 abuts against the chute GM31 and the holding portion H121 abuts against the fixed holding member GM33, whereby the pivot in the arrow direction is stopped.

FIG. 4 shows views showing a striking operation of the hammer H10 in stages. In FIG. 4, the cup CP shown in FIG. 3 is not shown. The torsion coil spring H30 is not shown.

(A) of FIG. 4 is a view showing the hammer H10 in the initial state, similarly to the hammer H10 shown in FIG. 3. That is, the striking portion H131 abuts against the left side wall portion of the chute GM31, and the holding portion H121 abuts against the rubber cap GM332 of the fixed holding member GM33. The operation arm H14 of the hammer H10 in the initial state extends to the right hand side of the operator, and the operator places a finger on a back side of a finger rest portion H141 at a tip end of the operation arm H14 to lift the finger rest portion H141. The hammer H10 pivots in a counterclockwise arrow direction against the biasing force of the torsion coil spring H30 shown in FIG. 3, and the hammer H10 enters a striking preparation state.

(B) of FIG. 4 is a view showing the hammer H10 in the striking preparation state. The hammer H10 in the striking preparation state is in a state in which the striking portion H131 is sufficiently separated from the chute GM31. In (B) of FIG. 4, the striking arm H13 abuts against the rubber cap GM332 of the fixed holding member GM33, and further counterclockwise pivot of the hammer H10 is prevented. However, the striking arm H13 may be allowed to pass between the two fixed holding members GM33 arranged in the backward direction, and the hammer H10 may be allowed to pivot counterclockwise. In (B) of FIG. 4, the finger rest portion H141 is still lifted by the operator.

(C) of FIG. 4 shows a state after the operator releases the finger from the finger rest portion H141. The hammer H10 is vigorously pivoted in the clockwise arrow direction by the elastic force of the torsion coil spring H30 shown in FIG. 3, and the striking portion H131 strikes the left side wall portion of the chute GM31 to apply an impact to the chute GM31. Due to this impact, ground beans Bdp adhering to an inner peripheral wall of the chute GM31 are peeled off, and are discharged from a discharge port GM311 of the chute GM31. The hammer H10 striking the left side wall portion of the chute GM31 returns to the initial state shown in (A) of FIG. 4.

FIG. 5 shows views showing a holding operation of holding the cup CP by the holding portion H121 of the hammer H10 and the fixed holding member GM33 in stages. In FIG. 5, the torsion coil spring H30 is also not shown.

(A) of FIG. 5 is a view showing the hammer H10 in the initial state, similarly to the hammer H10 shown in FIG. 3. Therefore, the holding portion H121 abuts against the rubber cap GM332 of the fixed holding member GM33. The finger rest portion H141 of the hammer H10 in the initial state is lifted in the same manner as in the striking operation. However, in the specification, it is not necessary to lift the finger rest portion H141 to a height as high as the striking operation, and it is just required that a gap large enough for a peripheral wall CP1 of the cup CP to enter is formed between the holding portion H121 and the rubber cap GM332. In (A) of FIG. 5, the cup CP is prepared below the hammer H10.

As shown in (B) of FIG. 5, when such a gap is formed between the holding portion H121 and the rubber cap GM332, the cup CP is lifted and the peripheral wall CP1 of the cup CP is inserted between the holding portion H121 and the rubber cap GM332. When the insertion is completed, the operator releases the finger from the finger rest portion H141 while holding the cup CP.

(C) of FIG. 5 shows the state after the operator releases the finger from the finger rest portion H141. The hammer H10 returns in a clockwise direction by the elastic force of the torsion coil spring H30 shown in FIG. 3, the holding portion H121 approaches the rubber cap GM332, and the peripheral wall CP1 of the cup CP is sandwiched between the rubber cap GM332 and the holding portion H121 as shown in (C) of FIG. 5. That is, although only one fixed holding member GM33 is shown here, two fixed holding members GM33 arranged side by side in the backward direction of the coffee bean grinding machine are in contact with the peripheral wall CP1 of the cup CP at two positions from an inner side of the peripheral wall CP1, and the holding portion H121 of the hammer H10 is in contact with the peripheral wall CP1 at one position from an outer side of the peripheral wall CP1. A state of the hammer H10 shown in (C) of FIG. 5 is referred to as a holding state. In the hammer H10 in this holding state, even if the hand is released from the cup CP, the cup CP is held by the elastic force of the coil spring H30. Furthermore, the rubber cap GM332 provided on the fixed holding member GM33 functions as a slip stopper of the cup CP, and the cup CP is more stably held. The holding portion H121 is made of a nylon resin containing glass fibers, and an anti-slip material is not added thereto, but the anti-slip material may be added to the holding portion H121 as in the rubber cap GM332 of the fixed holding member GM33.

As described above, shift from the initial state to the holding state is performed by operating the finger rest portion H141, but it is also possible to insert the peripheral wall CP1 between the holding portion H121 and the rubber cap GM332 with a force of lifting the cup CP without operating the finger rest portion H141. In particular, if the cup CP is made of metal or the like and is less likely to be broken, as will be described later, it is not necessary to make the elastic force of the torsion coil spring H30 stronger than necessary, and thus, it is possible to easily shift from the initial state to the holding state only by the force of lifting the cup CP.

A mouth CP2 of the cup CP shown in (C) of FIG. 5 is located above the discharge port GM311 of the chute GM31, and the ground beans discharged from the discharge port GM311 are reliably accommodated in the cup CP.

(D) of FIG. 5 is a view showing a state in which the cup CP is removed from between the holding portion H121 of the hammer H10 in the holding state and the rubber cap GM332.

When the discharge of the ground beans from the chute GM31 ends, the cup CP is removed. First, the cup CP is held by a left hand, and the finger rest portion H141 of the hammer H10 in the holding state is slightly lifted by a finger of the right hand in the same manner as in the case of (A) of FIG. 5. Thus, the gap is formed between the holding portion H121 and the rubber cap GM332, and the cup CP can be removed by pulling the cup CP downward. Thereafter, the striking operation of the hammer H10 described with reference to FIG. 4 may be performed to strike down the ground beans adhering to the inner peripheral wall of the chute GM31.

In a coffee bean grinding machine in related art, it is necessary to always hold the cup CP during a grinding process, and it is difficult to perform other work. However, in this modification, since the cup CP is held by the coffee bean grinding machine, it is easy to perform other work during the grinding process. Furthermore, since the hammer H10 is used for two purposes such as the holding of the cup CP and the striking of the chute GM31, a space for disposing members is made compact and a cost is also reduced as compared with a case in which separate members are provided for these two purposes. Since the chute GM31 is manually struck, the disposition space is more compact and the cost is lower than in a case in which the chute GM31 is electrically driven. Further, in the case in which the chute GM31 is manually struck, the use of the torsion coil spring H30 enables the cup CP to be held by utilizing the elastic force of the torsion coil spring H30. As described above, when the common torsion coil spring H30 is used for striking the chute GM31 and holding the cup CP, since the striking and the holding are performed in different scenes, it is considered that the striking and the holding are performed at a common portion of the hammer G10. For example, the cup CP may be sandwiched between the chute GM31 and the striking portion H131. In this case, it is necessary to provide an anti-slip member such as the rubber cap GM332 in at least one of the chute GM31 and the striking portion H131. However, the anti-slip member such as the rubber cap GM332 generally has a function of weakening the impact, and when the chute GM31 is struck, the impact caused by the striking is weakened. Therefore, it is necessary to increase the elastic force of the torsion coil spring H30, and an operation of the operation arm H14 may become difficult. On the other hand, in the above-described modification, by providing the striking portion H131 and the holding portion H121 at different portions, it is not necessary to make the elastic force of the torsion coil spring H30 stronger than necessary, and the operation of the operation arm H14 becomes easy.

Next, when the coffee bean grinding machine shown in FIG. 1 is used as the coffee bean grinding machine according to a first embodiment, a coffee bean grinding machine according to a second embodiment will be described. In the following description, components having the same names as those of the components described above are also denoted by the same reference numerals as those used above. Differences from the coffee bean grinding machine shown in FIG. 1 will be described, and a repetitive description will be omitted.

FIG. 6 shows perspective views of the coffee bean grinding machine according to the second embodiment. (A) of FIG. 6 is a perspective view of the coffee bean grinding machine GM holding the cup CP when viewed obliquely from the front left of the machine, that is, from the front right when viewed from an operator, and (B) of FIG. 6 is a perspective view of the coffee bean grinding machine GM from which the cup CP is removed when viewed obliquely from the front right of the machine, that is, from the front left when viewed from the operator.

The coffee bean grinding machine GM according to the second embodiment shown in FIG. 6 includes a mechanism similar to the hammer mechanism H1 described with reference to FIGS. 3 to 5, and FIG. 6 shows the operation arm H14 of the hammer H10. (A) of FIG. 6 shows the two fixed holding members GM33 each including the rubber cap GM332 attached to a lower end thereof. Further, (B) of FIG. 6 shows the holding portion H121 of the hammer H10. The hammer H10 shown in (A) of FIG. 6 is in a holding state, and the hammer H10 shown in (B) of FIG. 6 is in an initial state.

In the coffee bean grinding machine GM shown in FIG. 1, the hammer member GM32 is provided on a right side of the machine, and the operator have to operate the hammer member GM32 with the left hand, but in the coffee bean grinding machine GM shown in FIG. 6, the operation arm H14 extends to a left side of the machine, and the operator can operate the operation arm H14 with the right hand. Further, most of a left half of the chute GM31 is covered with a front cover GM40, and the striking portion H131 of the hammer H10 is also invisible due to the front cover GM40 . The discharge port GM311 is not covered by the front cover GM40.

Next, the hammer mechanism H1 of the coffee bean grinding machine GM shown in FIG. 6 will be described in detail. Differences from the hammer mechanism H1 described with reference to FIGS. 3 to 5 will be mainly described, and a repetitive description will be omitted.

(A) of FIG. 7 is an enlarged view showing a state in which the front cover GM40 is removed from the coffee bean grinding machine GM shown in FIG. 6, and (B) of FIG. 7 is an exploded perspective view of the hammer mechanism H1.

As shown in (B) of FIG. 7, the hammer mechanism H1 includes the hammer H10 and the shaft H20. The shaft H20 is fixed to the detached front cover GM40. FIG. 7 also shows the shaft GM331 of the fixed holding member GM33. An upper end portion of the shaft GM331 is also fixed to the removed front cover GM40

The hammer H10 is obtained by integrally molding a nylon resin containing glass fibers, and includes the shaft penetrating portion H11, the holding arm H12, the striking arm H13, and the operation arm H14. The hammer mechanism H1 also includes a torsion coil spring H. The torsion coil spring H includes a coil portion wound in a coil shape and arm portions extending in two directions from the coil portion. The torsion coil spring H is fitted into the shaft penetrating portion H11, and the shaft H20 penetrates through the coil portion. In FIG. 7, one of arm portions H31 extending in the two directions from the coil portion is visible. (B) of FIG. 7 also shows a slip-off preventing member H21 attached to a tip end of the shaft H20.

A holding portion H121 protruding toward the fixed holding member GM33 is provided at a tip end portion of the holding arm H12, and in (A) of FIG. 7, the holding portion H121 abuts against the rubber cap GM332 of the fixed holding member GM33.

(A) of FIG. 7 shows the hammer H10 in the initial state. In the hammer mechanism H1 mounted on the coffee bean grinding machine GM according to the second embodiment, a biasing direction by an elastic force of the coil spring H30 is opposite to that of the hammer mechanism H1 shown in FIG. 3. That is, the hammer H10 shown in (A) of FIG. 7 is biased in a counterclockwise direction, and the striking portion H131 abuts against the chute GM31 and the holding portion H121 abuts against the rubber cap GM332 of the fixed holding member GM33, whereby pivot in the counterclockwise direction is stopped. In (A) of FIG. 7, a portion of the chute GM31 against which the striking portion H131 abuts is invisible, but in (B) of FIG. 7, the portion is visible. An L-shaped receiving portion GM312 is provided at the portion of the chute GM31 against which the striking portion H131 abuts. Like the hammer H10, the chute GM31 is also obtained by integrally molding nylon resin containing glass fibers by injection molding. The receiving portion GM312 is also integrally formed with a tubular portion GM313 and the like. The receiving portion GM312 is thick in order to increase strength. The receiving portion GM312 is provided with a slit, and the slit is thinned to prevent sink marks in manufacturing.

Here, a structure of the chute GM31 will be further described with reference to (B) of FIG. 7. (B) of FIG. 7 shows a frame member 694. The chute GM31 can be opened and closed in a lateral direction about a pivot shaft GM314 extending in an upper-lower direction. When the chute GM31 is opened in the lateral direction, a discharge port of ground beans ground by the second grinder can be accessed, and maintenance such as cleaning around the discharge port can be easily performed. The chute GM31 shown in (B) of FIG. 7 is joined to a frame member 694 side by a magnetic force at a position of an upper joint portion GM315, and the chute GM31 is prevented from unexpectedly opening. In the tubular portion GM313 of the chute GM31, a position just beside the upper joint portion GM315 is an inlet 3130 (see (B) of FIG. 8). The discharge port of the ground beans ground by the second grinder is provided in the frame member 694, the inlet 3130 is connected to the discharge port, and the ground beans rapidly fly out from the discharge port. The ground beans collide with an inner peripheral wall of the tubular portion 313 at a height position between the inlet 3130 and the receiving portion GM312, and if left unattended, the ground beans will accumulate at a colliding position, which may hinder the discharge of the ground beans from the chute GM31. Therefore, a striking operation of the hammer H10 is performed.

In the striking operation of the hammer H10 shown in FIG. 7, the finger is placed on the finger rest portion H141 which is a tip end portion of the operation arm H14 of the hammer H10 in the initial state, and the hammer H10 is pushed downward (see an arrow shown in (A) of FIG. 7). The hammer H10 pivots such that the striking portion H131 is lifted up, and enters a striking preparation state. When the finger is released from the finger rest portion H141 in this state, the hammer H10 is vigorously pivoted in the counterclockwise direction by the elastic force of the torsion coil spring H30. That is, the striking portion H131 is vigorously pivoted from a position on a 10 o'clock side toward the receiving portion GM312 provided at a position on a 9 o'clock side, and the striking portion H131 strikes the receiving portion GM312 to apply an impact to the chute GM31. Due to this impact, the ground beans adhering to the inner peripheral wall of the tubular portion GM313 are peeled off, and are discharged from the discharge port GM311 of the chute GM31. The receiving portion GM312 includes an inclined surface 3121 inclined in a manner of protruding toward the hammer H10 as it extends downward, and a protruding surface 3122 protruding toward the hammer H10 from a lower end of the inclined surface 3121.

(A) of FIG. 8 is a side view of the hammer H10, and (B) of FIG. 8 is a perspective view showing the hammer H10 and the chute GM31 from below. In (B) of FIG. 8, the discharge port GM311 of the chute GM31 opens toward a front side of the paper. In (B) of FIG. 8, a lower side in the figure is a second grinder side, and the inlet 3130 of the chute GM31 that is connected to a discharge port of the second grinder is also shown.

(A) of FIG. 8 shows a first striking surface 1311 of the striking portion H131 which abuts against the inclined surface 3121 of the receiving portion GM312. When the hammer H10 is in the initial state, the first striking surface 1311 abuts against the entire inclined surface 3121. (A) of FIG. 8 also shows a second striking surface 1312 of the striking portion H131 which abuts against the protruding surface 3122 of the receiving portion GM312. Further, as shown in (B) of FIG. 8, when the hammer H10 is in the initial state, the second striking surface 1312 also abuts against the entire protruding surface 3122. In (B) of FIG. 8, a length of a lateral width of each portion is a length in the upper-lower direction indicated by an arrow Wt. A lateral width of the second striking surface 1312 is larger than a lateral width of the protruding surface 3122 shown in (B) of FIG. 8, and a lateral width of the first striking surface 1311 is larger than a lateral width of the inclined surface 3121. That is, a lateral width of the striking portion H131 is wider than a lateral width of the receiving portion GM312, and the striking portion H131 reliably abuts against the receiving portion GM312.

The striking portion H131, which is pivoted, continues to pivot while the first striking surface 1311 collides with the inclined surface 3121 at first, and finally stops when the second striking surface 1312 collides with the protruding surface 3122. As a result, the chute GM31 is struck obliquely. That is, an impact in a downward direction and an impact in the lateral direction are applied to the chute GM31, vibrations in a plurality of directions are generated, and the ground beans adhering to the inner peripheral wall are more likely to peel off. In the hammer mechanism H1 shown in FIG. 7, since the elastic force of the coil spring H30 is not excessively strong, it is possible to easily perform the striking operation by slightly strongly flicking the finger rest portion H141 of the hammer H10 in the initial state downward. If this flicking operation is repeatedly and continuously performed, striking the chute GM31 more effectively functions.

Next, a holding operation of the cup CP will be described with reference to FIG. 6 and the like.

A finger of the right hand is placed on the finger rest portion H141 of the hammer H10 in the initial state shown in (B) of FIG. 6, and the hammer H10 is lightly pressed to form a gap large enough for the peripheral wall CP1 of the cup CP to enter between the holding portion H121 and the rubber cap GM332. The cup CP is held by the left hand, and the peripheral wall CP1 of the cup CP is inserted between the holding portion H121 and the rubber cap GM332. When the insertion is completed, the operator releases the finger from the finger rest portion H141 while holding the cup CP. The hammer H10 returns in the counterclockwise direction by the elastic force of the torsion coil spring H30, and enters a state (holding state) shown in (A) of FIG. 6 in which the peripheral wall CP1 of the cup CP is sandwiched between the rubber cap GM332 and the holding portion H121. That is, the two fixed holding members GM33 arranged side by side are in contact with the peripheral wall CP1 of the cup CP at two positions from an outer side of the peripheral wall CP1, and the holding portion H121 of the hammer H10 is in contact with the peripheral wall CP1 at one position from an inner side of the peripheral wall CP1. In this state, even if the hand is released from the cup CP, the cup CP is held by the elastic force of the coil spring H30. Furthermore, the rubber cap GM332 functions as a slip stopper of the cup CP, and the cup CP is held more stably.

The grinding process is executed in the coffee bean grinding machine GM, the ground beans are discharged from the chute GM31, and the ground beans are accommodated in the cup CP held by the coffee bean grinding machine GM. When the discharge of the ground beans from the chute GM31 is completed, the cup CP is held with the left hand, and the finger of the right hand is placed on the finger rest portion H141 of the hammer H10 in the holding state, and the hammer H10 is lightly pressed. Thus, the gap is formed between the holding portion H121 and the rubber cap GM332, and the cup CP can be removed by pulling the cup CP downward. Thereafter, the striking operation of the hammer H10 may be performed to strike down the ground beans adhering to the inner peripheral wall of the chute GM31.

In the hammer mechanism H1 according to the second embodiment, since it is not necessary to make the elastic force of the torsion coil spring H30 stronger than necessary, a shift from the initial state to the holding state and a shift from the holding state to the initial state can be performed only by the force for operating the cup CP without operating the finger rest portion H141.

According to the above description, there is described "a coffee machine [for example, the coffee bean grinding machine GM or the above-described beverage production device] including a grinder [for example, the pulverizing device 5] configured to grind coffee beans, and a chute (for example, the chute GM31) configured to discharge ground beans ground by the grinder, the coffee machine including:

a pivotable hammer [for example, the hammer H10]; and a first holding member [for example, the fixed holding member GM33], in which the hammer includes a striking member [for example, the striking portion H131] that abuts against the chute by an elastic force in an initial state [for example, FIG. 3, (A) of FIG. 4, (A) of FIG. 5, (B) of FIG. 6, and (A) of FIG. 7], and a second holding member [for example, the holding portion H121] that sandwiches and holds a cup [for example, the cup CP] accommodating ground beans discharged from the chute with the first holding member by the elastic force, and enters a striking preparation state [for example, (B) of FIG. 4] in which the striking member is temporarily separated from the chute by pivoting from the initial state, the second holding member is disposed at a position where a distance from the first holding member is smaller than a thickness of a peripheral wall [for example, the peripheral wall CP1] of the cup in the initial state, and the striking member applies an impact to the chute when the hammer returns from the striking preparation state to the initial state by the elastic force [for example, (C) of FIG. 4]."

According to this coffee machine, since the impact is applied to the chute by utilizing the elastic force, a mechanism that reduces accumulation of the ground beans on an inner peripheral wall of the chute can be mounted compactly and inexpensively. Further, since the hammer also functions as a member that holds the cup, not only operability is improved, but also the machine can be made more compact and a cost is also reduced as compared with a case in which the striking member and the holding member are separately provided.

The coffee machine can be widely applied as long as the coffee machine is a device that performs adjustment using the coffee beans, and may be a coffee beverage production device or a coffee bean grinding machine.

An elastic force imparting member (for example, a spring member) that imparts the elastic force may be provided.

The hammer may enter a holding state when the cup is inserted between the first holding member and the second holding member. The holding state may be a state in which the gap can be formed between the striking member and the chute.

The second holding member may be disposed at a position in contact with the first holding member in the initial state.

The hammer includes the striking member and the second holding member at different positions. For example, the striking member and the second holding member may be provided at branched positions. That is, the hammer may include a first arm portion [for example, the striking arm H13] and a second arm portion [for example, the holding arm H12] different from the first arm portion, the first arm portion may be provided with the striking member [for example, the striking portion H131], and the second arm portion may be provided with the second holding member [for example, the holding portion H121]. More specifically, the hammer may include the first arm portion that abuts against the chute in the initial state and the second arm portion that abuts against the peripheral wall of the cup in the holding state, the first arm portion may be provided with the striking member at a portion that abuts against the chute in the initial state, and the second arm portion may be provided with the second holding member at a portion that abuts against the peripheral wall of the cup in the holding state.

There is also described "the coffee machine, in which at least one of the first holding member and the second holding member includes an anti-slip portion [for example, the rubber cap GM332]."

The cup is held more stably by providing the anti-slip portion. Further, since the striking member is a member separate from the second holding member, even if the anti-slip portion is provided, striking the chute by the striking member is not affected.

Each of the first holding member and the second holding member may include the anti-slip portion.

There is also described "the coffee machine, in which one [for example, the holding portion H121 shown in FIG. 6] of the first holding member and the second holding member is in contact with the peripheral wall at one position from an inner side of the peripheral wall [for example, the peripheral wall CP1], and the other [for example, the fixed holding member GM33 shown in FIG. 6] of the first holding member and the second holding member with respect to the one holding member is in contact with the peripheral wall at two positions from an outer side of the peripheral wall [for example, the peripheral wall CP1]."

The cup is held more stably by holding the peripheral wall at three positions.

Further, there is also described "the coffee machine, in which the first holding member is fixedly disposed and corresponds to the other holding member [for example, the fixed holding member GM33 shown in FIG. 6], and the second holding member corresponds to the one holding member [for example, the holding portion H121 shown in FIG. 6]."

According to this aspect, since the second holding member in the pivotable hammer is in contact with the peripheral wall at one position, there are advantages that a weight of the hammer can be reduced and the hammer can be easily operated.

There is also described "the coffee machine, in which the hammer includes an operation portion [for example, the finger rest portion H141] that is operated when the hammer shifts from the initial state to the striking preparation state, and the operation portion is located on a right hand side of an operator."

It is easy for a right-handed operator to operate the operation portion.

The operation portion is operated both when the hammer shifts from the initial state to the holding state and when the hammer returns from the holding state to the initial state.

A configuration of the coffee bean grinding machine GM described above can also be applied to a coffee bean grinding portion in the beverage production device including the coffee bean grinding portion and an extraction device that extracts a coffee beverage from beans ground in the coffee bean grinding portion.

The present invention is not limited to the embodiments and examples described above, and the contents thereof can be combined with each other without departing from the spirit of the present invention, and may be partially changed according to a purpose or the like. The individual terms described in the present specification are merely used for the purpose of describing the present invention, and it is needless to say that the present invention is not limited to strict meanings of the terms, and can include equivalents thereof. For example, expressions such as "device" and "portion" may be described as "unit", "module", or the like.

Reference Signs List

GM coffee bean grinding machine
4 reservoir device
5 pulverizing device
11 control device
12 information display device
GM31 chute
GM33 fixed holding member
H10 hammer
H121 holding portion
H131 striking portion
H141 finger rest portion
GM332 rubber cap
CP cup
CP1 peripheral wall

The invention claimed is:

1. A coffee machine including a grinder configured to grind coffee beans, and a chute configured to discharge ground beans ground by the grinder, the coffee machine comprising:
a pivotable hammer; and
a first holding member, wherein
the hammer includes a striking member that abuts against the chute by an elastic force in an initial state, and a second holding member that sandwiches and holds a cup accommodating the ground beans discharged from the chute with the first holding member by the elastic force, and enters a striking preparation state in which the striking member is temporarily separated from the chute by pivoting from the initial state,
the second holding member is disposed at a position where a distance from the first holding member is smaller than a thickness of a peripheral wall of the cup in the initial state, and
the striking member applies an impact to the chute when the hammer returns from the striking preparation state to the initial state by the elastic force.

2. The coffee machine according to claim 1, wherein
at least one of the first holding member and the second holding member includes an anti-slip portion.

3. The coffee machine according to claim 1, wherein
one of the first holding member and the second holding member is in contact with the peripheral wall at one position from an inner side of the peripheral wall, and
the other of the first holding member and the second holding member with respect to the one holding member is in contact with the peripheral wall at two positions from an outer side of the peripheral wall.

4. The coffee machine according to claim 3, wherein
the first holding member is fixedly disposed and corresponds to the other holding member, and
the second holding member corresponds to the one holding member.

5. The coffee machine according to, wherein
the hammer includes an operation portion that is operated when the hammer shifts from the initial state to the striking preparation state, and
the operation portion is located on a right hand side of an operator.

* * * * *